(12) United States Patent
Sabo et al.

(10) Patent No.: US 9,333,427 B2
(45) Date of Patent: May 10, 2016

(54) SYSTEM AND METHOD FOR USING INTERCONNECTING BLOCKS AS INPUT AND OUTPUT FOR ELECTRONIC DEVICES

(71) Applicant: Digital Dream Labs, LLC, Pittsburgh, PA (US)

(72) Inventors: Justin Sabo, Pittsburgh, PA (US); Matthew Stewart, Pittsburgh, PA (US); Peter Borman Kinney, Townsend, DE (US)

(73) Assignee: Digital Dream Labs, LLC, Pittsburgh, PA (US)

( * ) Notice: Subject to any disclaimer, the term of this patent is extended or adjusted under 35 U.S.C. 154(b) by 176 days.

(21) Appl. No.: 14/215,840

(22) Filed: Mar. 17, 2014

(65) Prior Publication Data

US 2014/0274412 A1   Sep. 18, 2014

Related U.S. Application Data

(60) Provisional application No. 61/789,891, filed on Mar. 15, 2013.

(51) Int. Cl.

| | |
|---|---|
| A63F 9/24 | (2006.01) |
| A63F 13/30 | (2014.01) |
| A63F 13/23 | (2014.01) |
| A63F 13/24 | (2014.01) |
| A63F 13/65 | (2014.01) |
| A63F 3/00 | (2006.01) |
| A63F 9/00 | (2006.01) |
| A63F 9/10 | (2006.01) |

(52) U.S. Cl.
CPC . *A63F 13/12* (2013.01); *A63F 9/24* (2013.01); *A63F 13/23* (2014.09); *A63F 13/24* (2014.09); *A63F 13/30* (2014.09); *A63F 13/65* (2014.09); *A63F 9/0073* (2013.01); *A63F 2003/00583* (2013.01); *A63F 2003/00725* (2013.01); *A63F 2009/1061* (2013.01); *A63F 2009/2444* (2013.01); *A63F 2009/2489* (2013.01); *A63F 2250/1026* (2013.01); *A63H 2200/00* (2013.01)

(58) Field of Classification Search
CPC ....... A63F 1/04; A63F 3/00643; A63F 13/00; A63F 13/10; A63F 13/12; A63F 2300/0131; A63F 2300/1062; A63F 2300/206; A63F 2300/2489; A63F 2300/405; A63F 2300/807; A63F 2300/00662; A63F 13/20; A63F 13/23
See application file for complete search history.

(56) References Cited

U.S. PATENT DOCUMENTS

| | | | |
|---|---|---|---|
| 6,352,478 B1 | 3/2002 | Gabai et al. | |
| 7,081,033 B1 | 7/2006 | Mawle et al. | |
| 8,548,613 B2 | 10/2013 | Presetenback et al. | |
| 2012/0019480 A1* | 1/2012 | Cannon | A63F 13/02 345/174 |
| 2012/0062490 A1* | 3/2012 | Heatherly | A63F 13/02 345/173 |

(Continued)

*Primary Examiner* — Jason Yen
(74) *Attorney, Agent, or Firm* — David G. Oberdick

(57) ABSTRACT

A minimum of one Master Block and one or more Activity Blocks connected (via "wireless or wired transmission") to a System (the "electronic device") for a digital and non-digital game, experience, or other engaging activity. Master Blocks can communicate with a System, and can connect to many Activity Blocks. Activity Blocks can communicate with Master Blocks. Furthermore, when multiple Activity Blocks are connected to a single Master Block, they create physical relationships between each other that the Master Block can detect and process and/or relay to the System as a form of input for whatever process the System is running. A user can interact with the System by manipulating the relationships between Activity Blocks and the Master Block.

18 Claims, 23 Drawing Sheets

(56) References Cited

U.S. PATENT DOCUMENTS

| | | | |
|---|---|---|---|
| 2012/0077593 A1* | 3/2012 | Sarmenta | A63F 3/00643 463/40 |
| 2012/0295700 A1 | 11/2012 | Reiche | |
| 2012/0295702 A1 | 11/2012 | Otero et al. | |
| 2013/0165223 A1 | 6/2013 | Leyland et al. | |
| 2013/0196766 A1 | 8/2013 | Leyland et al. | |
| 2013/0296058 A1 | 11/2013 | Leyland et al. | |
| 2013/0340004 A1 | 12/2013 | Prestenback et al. | |

* cited by examiner

SYSTEM AND METHOD FOR USING INTERCONNECTING BLOCKS AS INPUT AND OUTPUT FOR ELECTRONIC DEVICES

CROSS-REFERENCE TO RELATED APPLICATIONS

This application is a non-provisional application of U.S. Provisional Application Ser. No. U.S. 61/789,891, titled SYSTEM AND METHOD FOR USING INTERCONNECTING BLOCKS AS INPUT AND OUTPUT FOR ELECTRONIC DEVICES, filed Mar. 15, 2013, incorporated by reference herein in its entirety.

BACKGROUND OF THE INVENTION

The present invention relates generally to toys and video games and more particularly, to a set of interconnecting toys, used in connection with a video game, whose physical arrangement controls aspects of the game.

Toys provide for, and encourage, physical play, allowing objects from a player's imagination to take on a physical representation. In this way, physical play makes abstract ideas concrete in the mind of the player.

Video games provide a different sort of play from traditional toys. Rather than leaving actions and consequence entirely up to the players imagination, video games are able to react to the player and change the experience during play.

While toys provide physical play, they provide very static experiences. Because of the physical limitations of toys, they cannot change as they are played with except in very limited ways. Meanwhile, video games provide very dynamic experiences that adjust and adapt as players continue to interact with them, but lack hands-on play. Therefore, there is a need to combine the strengths of toys and video games, hands-on interaction with physical pieces and the dynamic and reactive possibilities through digital content.

BRIEF SUMMARY OF THE INVENTION

There are provided systems and methods for a set of interactive toys and electronic system for interaction with a video game through play with physical toys, as set forth more completely in the claims.

BRIEF DESCRIPTION OF THE FIGURES

In order that the invention may be more readily understood, and so that further features thereof may be appreciated, embodiments of the invention will now be described, by way of example, with reference to the accompanying drawings in which.

DETAILED DESCRIPTION OF THE DRAWINGS

Figure 1:
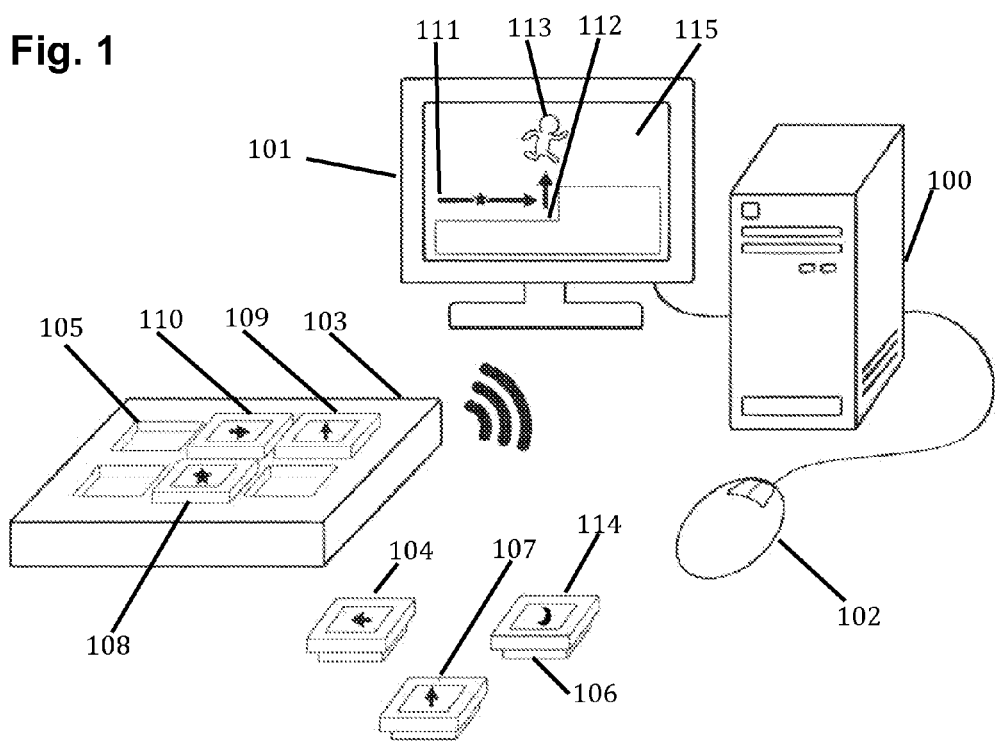
FIG. 1 is an example of a video game system in accordance with certain aspects of the invention.

FIG. 1 is an example of a video game system in accordance with aspects of the invention. The video game system includes a System 100 with a processor for executing program instructions providing for gameplay, display device 101, user input device(s) 102 such as a controller, a Master Block 103, and at least one Activity Block such as 104. The processor, responsive to inputs from input devices 102 and the Master Block 103, generally controls the output on the display device 101, showing characters and elements relating to game play. The Master Block 103, in some embodiments, connects to the System 100 via a wireless connection, but can also connect via a wired connection.

Instructions providing game play are generally stored on the System 100 in internal or removable memory, such as an optical disk or USB flash drive. Some embodiments of the System 100 may have the display 101 and user input 102 built in, such as a smart-phone device or tablet with touchscreen, while others may be connected to external inputs 102 and displays 101, such as a desktop personal computer.

The display device 101 is generally connected to the System 100 by a direct connection, such as a cable or internal circuitry, although some embodiments may use a wireless connection. Many embodiments will use a display such as a TV screen, computer monitor, or tablet screen, but any display capable of visual output could be used. The display device is generally controlled by the System 100, and shows images pertaining to game play.

The user input device(s) 102 provide the user or game player some method of interacting with the System 100, for example, a keyboard, mouse, or game controller. Input devices 102 can be connected to the System 100 via wired or wireless connection. While the presence of at least one input device 102 is typical, some embodiments may omit input devices and instead have users or game players interact with the System 100 and the game play entirely through the Master Block 103 and Activity Blocks 104, 107, 108, 109, 110, and 114.

The Master Block 103 connects to the System 100 via wired or wireless connection and provides the game player another way to interact with the System 100 and game play. The Master Block 103 sends information regarding the current state of the Master Block 103 to the System 100. This state, which includes information regarding any Activity Blocks 104, 107, 108, 109, 110, and 114 connected to the Master Block 103, is used by the System 100 in executing the instructions providing game play in a manner very similar to the way data from input devices 102 is used. The System 100 can also send output to the Master Block 103 to manipulate the state of the Master Block 103, or to have the Master Block 103 relay output to any Activity Blocks 104, 107, 108, 109, 110, and 114 that are connected to the Master Block 103.

The Activity Blocks 104, 107, 114, 110, 108, and 109 contain machine-readable information, for example a radio frequency identification (RFID) tag, bar code, or physical key. The Master Block 103 includes the capacity to read the information from the Activity Blocks 104, 107, 108, 109, 110, and 114 at a multitude of locations on and/or surrounding the Master Block 103 arranged in a two-dimensional or three-dimensional grid such as the square grid shown on the Master Block 103. Furthermore, the Master Block 103 can differentiate between information read at one reading location from information read at any other reading location. Therefore, the Master Block 103 can detect the presence, identity, and location of any Activity Blocks 104, 107, 108, 109, and 114 placed in one of the reading locations. In most embodiments, the reading locations correlate one-to-one to physical markers on the Master Block 103, for example, pockets 105 on the upper surface of the Master Block 103. In many embodiments, the Master Block 103 can also send commands to the Activity Blocks 104, 107, 108, 109, 110, and 114 to modify the information stored therein.

The Master Block 103, in some embodiments, has several pockets 105 on its upper surface for placing of objects therein. The game player generally places objects relating to the game, for example Activity Block 104, into the grid of pockets 105 during game play. The information of which Activity Blocks 104, 107, 108, 109, 110, and 114 are placed in which pockets 105 in the grid of pockets has specific meaning to the game. For example, Activity Blocks 104, 107, 108, 109, 110, and 114 placed on the Master Block 103 could represent instructions for a character to perform during game play and the organization of those Activity Blocks 104, 107, 108, 109, 110, and 114 in the grid of pockets on the Master Block 103 determine the order in which the instructions are executed by the avatar.

In many embodiments in which the grid-based reading locations of Activity Blocks 104, 107, 108, 109, 110, and 114 on the Master Block 103 correlate to locations of physical markers in the form of pockets 105, the Activity Blocks 104, 107, 108, 109, 110, and 114 have a paired or matching physical marker to indicate that the Activity Blocks 104, 107, 108, 109, 110, and 114 should be placed in the reading locations in the pockets 105. For example, the pockets 105 shown on the Master Block 103 pair with the square pegs 106 on the bottom of each Activity Block 104 in that the square pegs 106 fit into the pockets 105.

In one embodiment of the invention regarding the video game running on System 100 and displayed via a screen 101, the initial state of Master Block 103 would have all Activity Blocks, such as 110, 109, and 108, removed from all pockets on the discrete grid, such as the six pockets shown on Master Block 103 and equivalent to the vacant pocket 105. The player would first turn on the System 100, observe the display 101, and use the mouse 102 to navigate System 103 and enable software 115 that is compatible with Master Block 103 to run properly in accordance with certain aspects of the invention. The software 115 would enable the use of a standard connectivity protocol, such as Bluetooth, in System 100 to begin a scanning procedure. The player would turn on the Master Block 103, which immediately broadcasts a signal which connects Master Block 103 to a compatible System, such as System 100, in range that is appropriate for the standard connectivity protocol being used by the System 100. Once a connection between Master Block 103 and System 100 is established, software 115 is notified and the player is now allowed to interact with software 115 via Master Block 103 and inputs such as 102 connected to System 100. The software 115 displays the starting position of the player avatar 113 in position 111. The player picks up Activity Block 110 and places in into the top-center pocket as shown in FIG. 1. Master Block 103, which continuously scans each of its gridspaces to identify newly placed or repositioned Activity Blocks in each pocket, recognizes Activity Block 110 and records its unique identifier and data, adds the row and column position of Activity Block 110, and sends this package of data wirelessly via Bluetooth to System 100, which makes the data package available to software 115 for interpretation. Software 115 processes the incoming data package primarily by referencing a lookup table for a specific gameplay function; for example, Activity Block 110 causes the player to move towards the right side of the screen. The player notices that avatar 113 is not moving quickly enough, so the player places Activity Block 108, which adds a speed boost to the effect of Activity Block 110, in the bottom-center pocket of Master Block 103. Activity Block 110 has a specific effect in the software because of its relative position to Activity Block 108. Master Block 103, which continuously scans for Activity Block changes, immediately captures the data, including position, and sends this updated data package consisting of data from Activity Block 110 and 108 to System for interpretation by software 115. The same data and position recognition of each Activity Block sent in data package(s) to the System is repeated, for example, when Activity Block 109, which causes avatar 113 to jump, is placed in the upper-right pocket. After Activity Blocks 108, 110, and 109 are placed, the Master Block 103 continues to scan each grid-space and send data packages back to the System 100, even if data packages are identical, indicating that no change to Activity Blocks has occurred. After the player has placed all three Activity Blocks into Master Block 103 needed to complete the gameplay challenge in software 115, the player utilizes mouse 102 to click through each command defined by the position of all Activity Blocks in Master Block 103, whereby the first command is "Go Right With Speed Boost". The player clicks to execute the command defined by to combination of Activity Block 110 and 108, causing avatar 113 to quickly move from position 111 to position 112. The player then clicks again to execute command as defined by Activity Block 109, causing avatar 113 to "Jump Vertically". The player is out of commands and therefore cannot execute any more commands as defined by the Activity Blocks. The Master Block continues to scan the grid-spaces and sends the data packages to the System 100 even while the player is interacting with software 115 directly and not interacting the Master Block or Activity Blocks. The player observes, but does not utilize, Activity Blocks 104, 107, and 114, which contain other commands for the player to use while interacting with software 115. Activity Block 107 and 109, while functionally serve the same purpose of making avatar 113 "Jump", are permitted to be read by Master Block 103 as discrete values in accordance with certain aspects of the invention. More than one of the same type of Activity Block can be read by Master Block 103 simultaneously in different grid-spaces. As player progresses through software 115, in a different level the player might take Activity Block 109 and move it to the upper-left pocket of Master Block 103, causing an effect on the gameplay whereby avatar 113 first jumps, because Activity Block 109 is now first in the sequence as read from left-to-right, then avatar 113 quickly moves to the right because Activity Block 110 and 108 combine to form the second command in the sequence.

Figure 2:
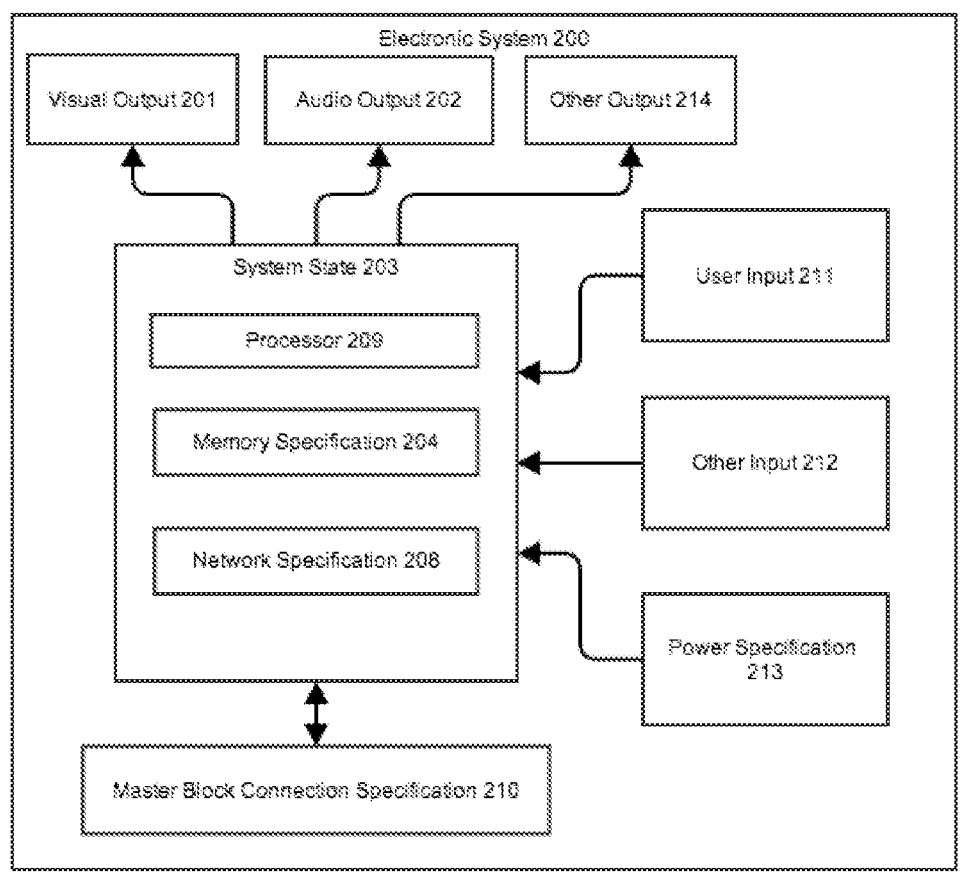
FIG. 2 is a block diagram of a typical System in accordance with certain aspects of the invention.

FIG. 2 is a block diagram of a process for an Electronic System, for example for a personal computer with mouse and keyboard, in accordance with certain aspects of the invention. The process may be performed on any device with communication protocols, such as a computer with mouse, and at least one type of output, such as a monitor. Starting with power specification 213, which consists of standard devices that release adequate power to charge the Electronic System. Once adequate power is present, system state 203 may begin functioning in accordance with certain aspects of the invention. In block 203, the System State is defined primarily by the memory specification 204, network specification 208, and processor 209 both monitoring and executing in tandem with one another. The processor 209 computes and executes all instructions for both the state of the software running on the electronic system and the network specification 208. Network capabilities 208, such as Wi-Fi or Bluetooth, allow integration of multiple electronic systems to send/receive data from one another. Software that requires use of certain aspects of the invention may also, through direct user interaction or automatically, send live streams of data to another computer/server and check and download updates or modifications to firmware or the software to ensure stability of the entire system. Memory specification 204 describes any state-saving electronic devices, such as RAM or hard drives containing software that may be used with certain aspects of the invention.

Figure 8:
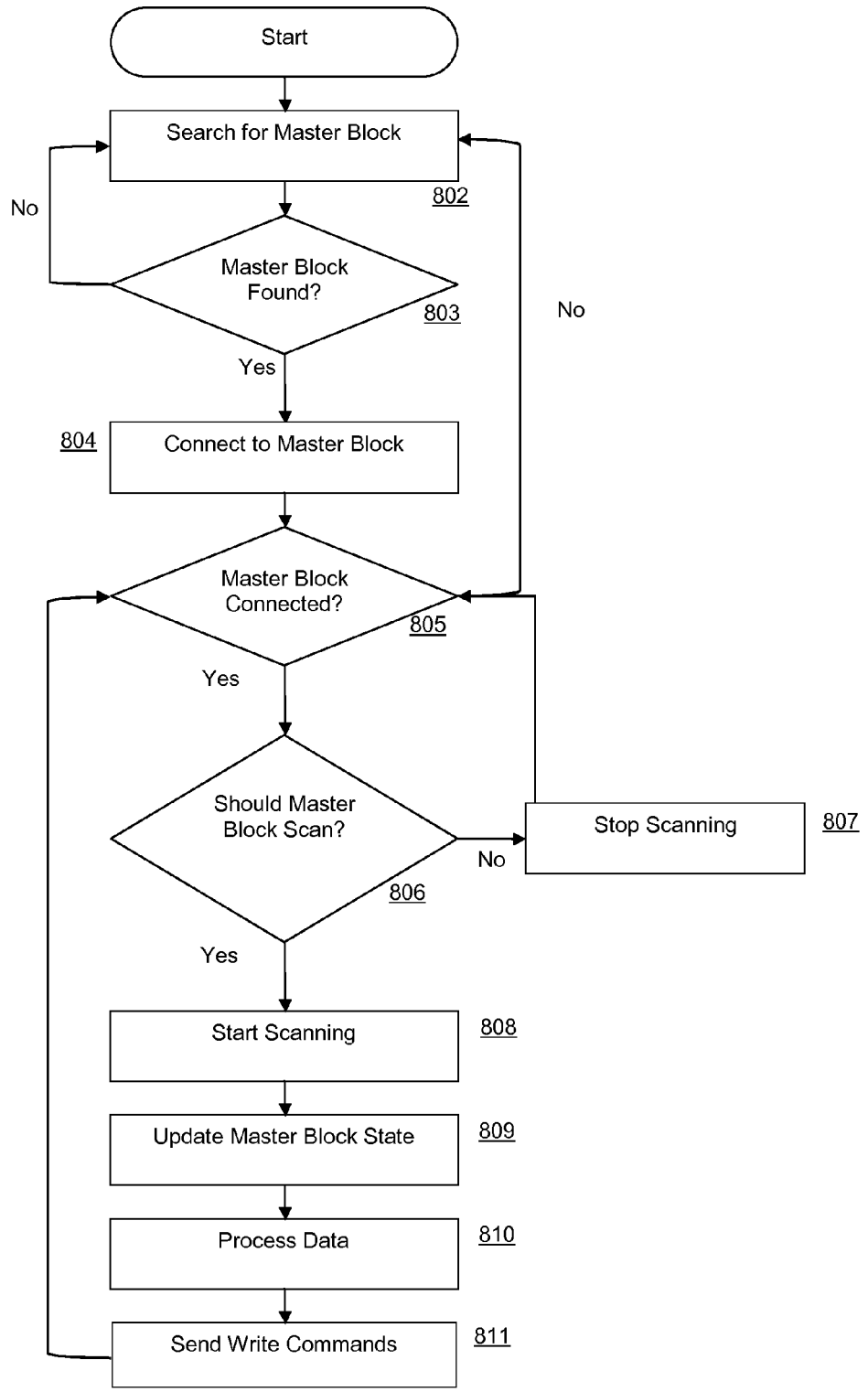
FIG. 8 is a flowchart of the process used by a System to manage a connection to a Master Block in accordance with certain aspects of the invention.

Once the system state has transmission instructions, such as to begin searching for a single or multiple Master Block(s), the Master Block connection specification 210 is enabled in accordance with certain aspects of the invention utilizes a standard transmission protocol, such as Bluetooth 4.0 radio, to send instructions, such as data to be written to the Master Block's firmware, as well as receive data, such as the exact state of the Master Block including other connected peripherals to the Master Block as in the process illustrated in FIG. 8. The Master Block connection specification 210 may directly control the speed of data rate transmission from the Electronic System to the Master Block in accordance with certain aspects of the invention.

Any changes to the system state 203, for example a user disabling power to a Master Block connected to the electronic system, may be updated and displayed on visual output 201. In block 201, the Visual Output consists of any necessary drivers, responsible for producing image signals, and displays, such as a television screen displaying "Master Block Disconnected" connected through HDMI, to the Electronic System. In block 202, the Audio Output consists of any necessary drivers, responsible for producing sound signals, and speakers, such as headphones connected to a ¼" phono jack, to the Electronic System. All forms of additional output would be handled in block 214 in accordance with certain aspects of the invention. In block 214, other output could be in the form of a light bulb or rotating motors that correspond to actions taken directly by the player or automatic signals sent by the Electronic System, for example software that teaches how electricity works.

In block 211, any input, such as keyboard strokes or mouse clicks that directly result from user action, is considered user input as related to certain aspects of the invention. Other input 212 describes devices that independently calculate and transmit data, such as a digital thermometer or light sensor, to be processed by the system state 203.

Figure 3:
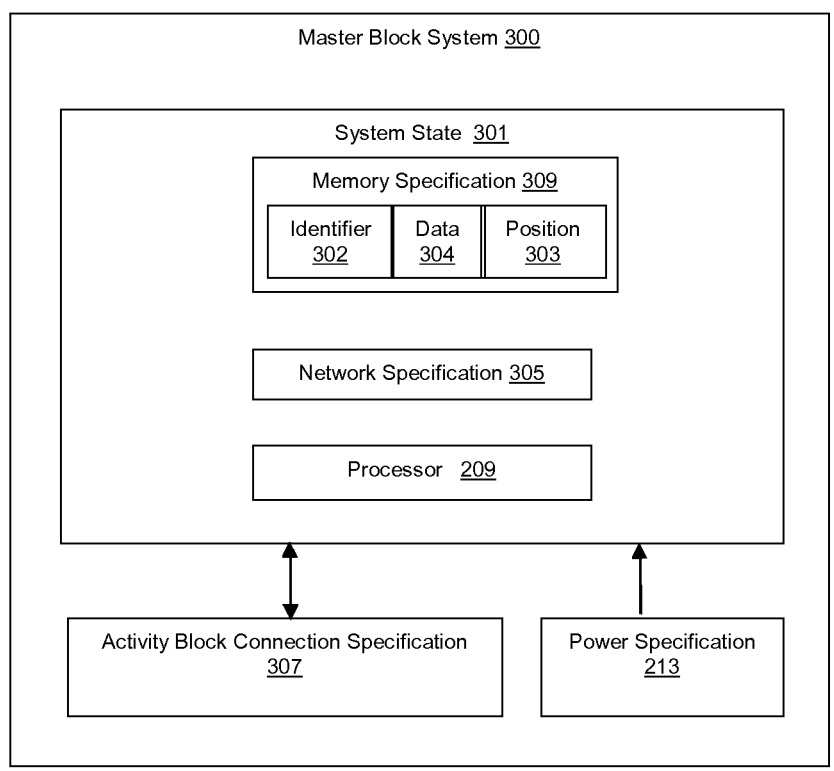
FIG. 3 is a block diagram of the minimum requirements for a Master Block in accordance with certain aspects of the invention.

FIG. 3 is a block diagram of a process for one embodiment of a Master Block with the minimum characteristics to still be considered a Master Block in accordance with certain aspects of this invention. The master block system 300 consists of the system state 301, I/O of the activity block connection specification 307, and I/O of the power specification 213. In block 305, refer to block 208 for functionality as it relates to network specification 208. The memory specification 309 consists of, but is not limited to, three types of information: identifier 302, data 304, and position 303. The processor 209 begins to scan the memory specification 309 to report back to the electronic system 200.

At least one Activity Block must be connected to a Master Block using a standard transmission protocol, such as an Activity Block with wireless RFID chip within a readable range of the Master Block with on-board RFID reader, to permit certain processes of the invention. An Activity Block connected to the system state 301 will alter the memory specification 309, for example, an Activity Block "Jump" is interpreted by the activity block connection specification 307 and recorded to memory on the Master Block. One embodiment of the invention may include several Activity Blocks directly connected to a single Master Block or a series of Activity Blocks connect to each other with a single Activity Block in the series connected to the Master Block. The "Jump" is given a unique identifier 302, data 204, and position 303, all of which are written into memory on Master Block for transmission via standard communication protocols to the electronic system.

In block 302, the unique identifier could be used for a single Activity Block, such as "Arrow Set #1", or a set of identical Activity Blocks, such as "Single Arrow." In block 304, the data could consist of, for example, how many arrows currently stored on that specific Activity Block for use of an avatar. In block 303, the position of the Activity Block, relative to the Master Block is transmitted as a two-dimensional value (row, column) or three-dimensional value (row, column, height) in accordance with certain aspects of the invention. The system state 301 checks for updates to the Activity Blocks which are connected at a data transmission rate as determined by the Electronic System, or if no data transmission rate is provided, updates are automatically computed several times per second and transmitted to the Electronic System.

Figure 4:
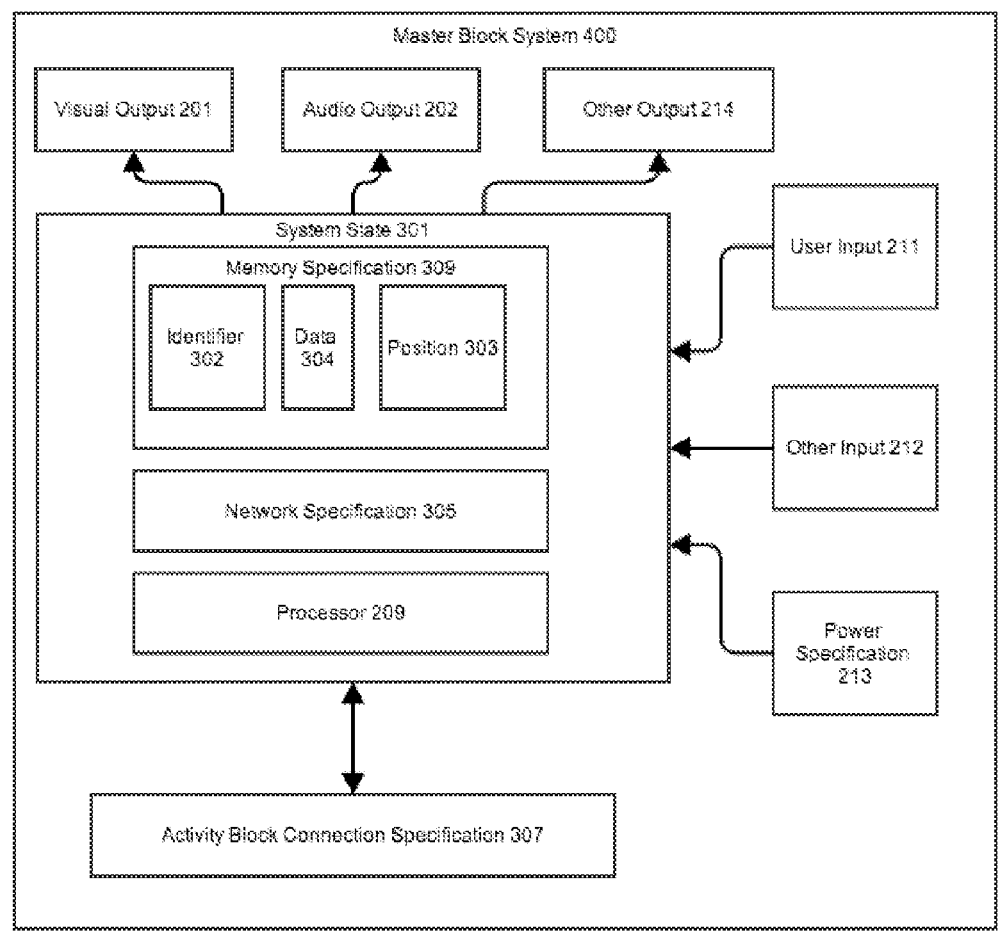
FIG. 4 is a block diagram of a Master Block with additional capabilities in accordance with certain aspects of the invention.

FIG. 4 is a block diagram of a process for another embodiment of a Master Block, with features not shown in FIG. 3, in accordance with certain aspects of this invention. FIG. 4 is identical to FIG. 3 with the following additions, visual output 201, audio output 202, user input 211, and other input 212, which are further described in the description of FIG. 2.

Figure 5:
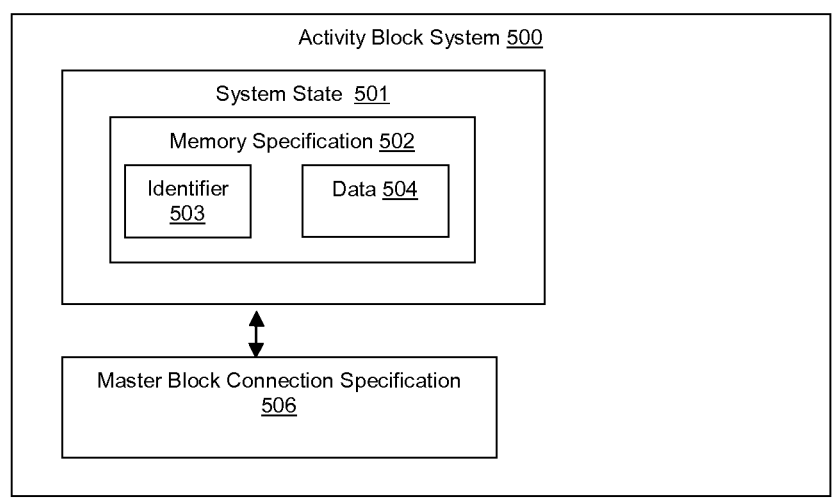
FIG. 5 is a block diagram of the minimum requirements for an Activity Block in accordance with certain aspects of the invention.

FIG. 5 is a block diagram of a process for one embodiment of an Activity Block System 500 which must connect to a Master Block in order to transmit data to the Electronic System 200. In block 501, the system state 501 consists only of the memory specification 502. The memory contains two discrete values: the unique identifier 503 as described in block 205, which directly relates to the grid-position of the Activity Block relative to the Master Block, and the data 504 as described in block 206. In the Master Block Connection Specification 506, the connection process is defined as wired, such as a standard USB for data transmission, or wireless, such as RFID. In one embodiment of the invention utilizing Activity Blocks with RFID, block 506, the Master Block Connection Specification, is powered by and transmitting data to and from the Master Block.

Figure 6:
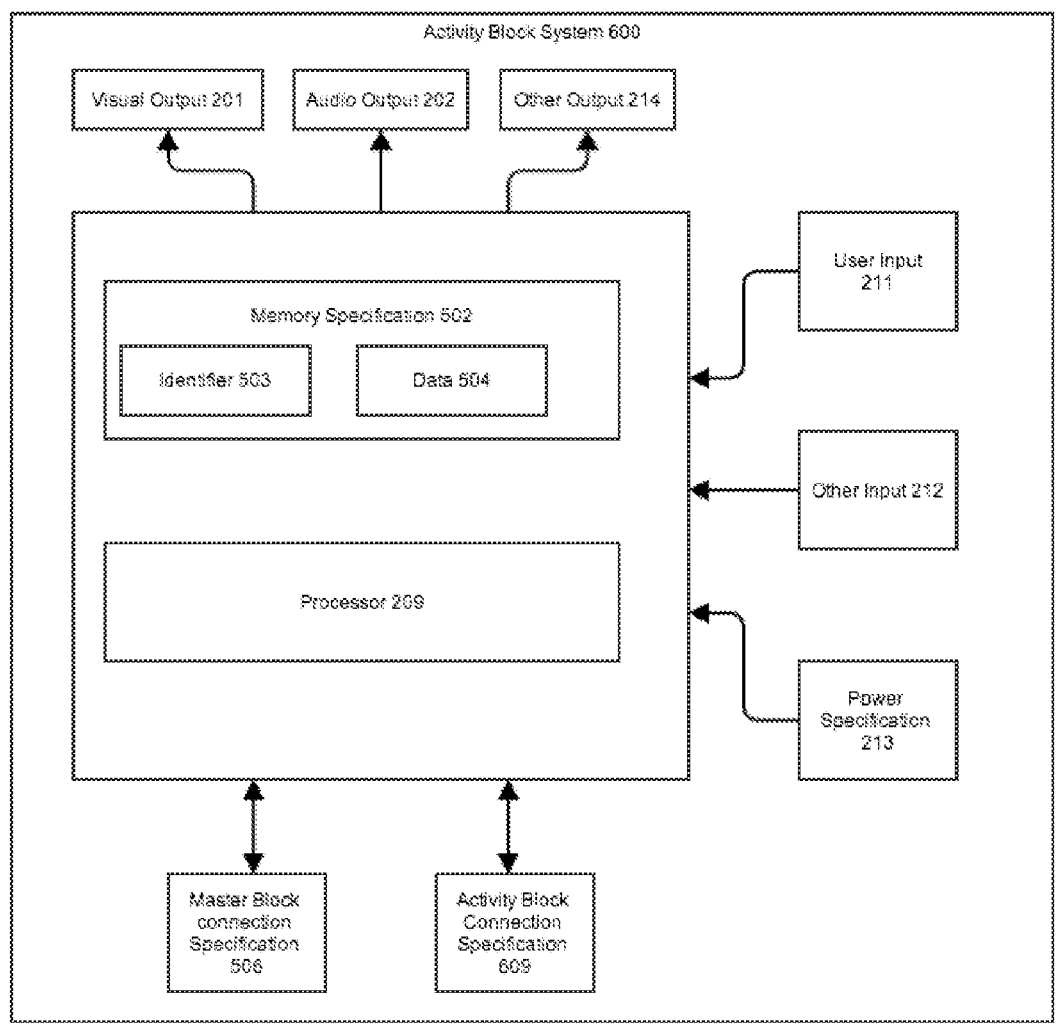
FIG. 6 is a block diagram of an Activity Block with additional capabilities in accordance with certain aspects of the invention.

FIG. 6 is a block diagram of a process for one embodiment of an Activity Block System 600, which has more features than FIG. 5. Visual Output 201, Audio Output 202, Other Output 214, User Input 211, Other Input 212, Power Specification 213, and Activity Block Connection Specification 609 are additions to the basic form of the Activity Block System 500 shown in FIG. 5. The activity block connection specification 609 permits data transmission, such as RFID, to combine memory specification 502 from each Activity Block and send a collection of memory specifications 502 to the Master Block each time the Master Block requests data in certain embodiments of the invention.

Figure 7A:
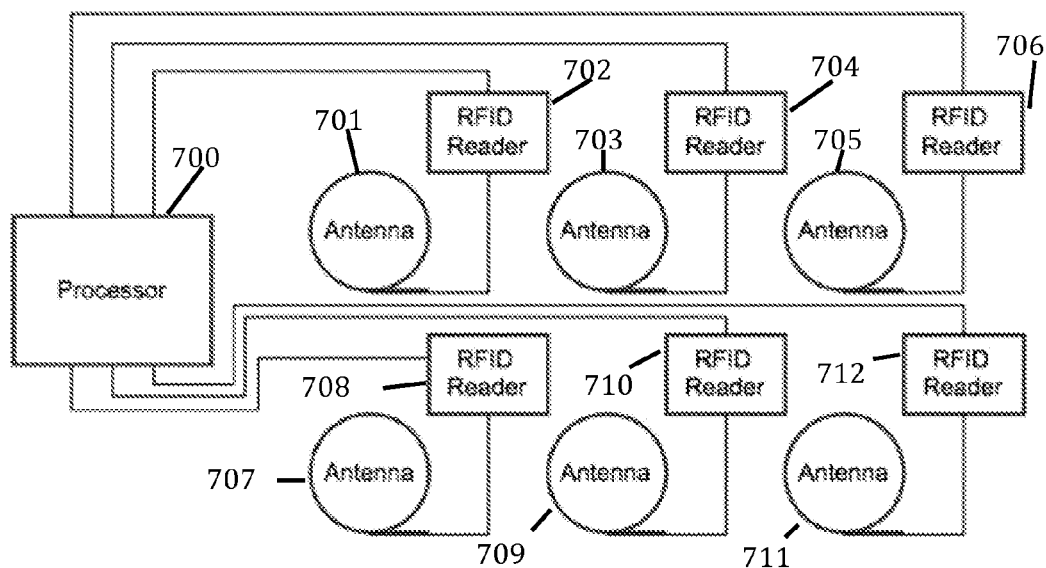
FIG. 7A is a diagram of an activity block connection specification of a Master Block in accordance with certain aspects of the invention.

FIG. 7A is a diagram of one embodiment of grid-based Activity Block Connection Specification 307 of a Master Block, controlled by the Master Block's processor 700, in accordance with certain aspects of the invention. In this embodiment, the communication between the Master Block and Activity Blocks is managed through the ISO/IEC 14443 Standard for Identification Cards, and uses a collection of RFID readers 702, 704, 706, 708, 710, and 712, along with a collection of RFID antenna 701, 703, 705, 707, 709, and 711, to connect to Activity Blocks placed in certain reading locations on and/or around the Master Block arranged in a grid-based layout. When the processor 700 determines that the Master Block should be scanning for connected Activity Blocks, it activates the RFID readers 702, 704, 706, 708, 710, and 712 and has each one search for any Activity Blocks in proximity to the connected antenna 701, 703, 705, 707, 709, and 711. Any Activity Blocks close enough to the antenna 701, 703, 705, 707, 709, and 711, will be detected and have their data read and transmitted back to the processor 700. The processor 700, will determine the location of each Activity Block detected in this manner based on which of the RFID readers 702, 704, 706, 708, 710, and 712, detected it. The processor stores all data collected about the presence, data, and location of Activity Blocks in the Master Block's memory specification 309. In some embodiments, it may not be possible to activate all RFID readers 702, 704, 706, 708, 710, and 712 at once due to signal interference between them. In these cases the scan is performed over multiple iterations of turning certain RFID readers on, collecting data from them, and turning the readers back off, each iteration activating different RFID readers until all RFID readers 702, 704, 706, 708, 710, and 712 have been activated. If the processor 700 determines that it should send commands to the Activity Blocks it can be done during this scanning process or through a separate activation of the RFID readers 702, 704, 706, 708, 710, and 712.

Figure 7B:
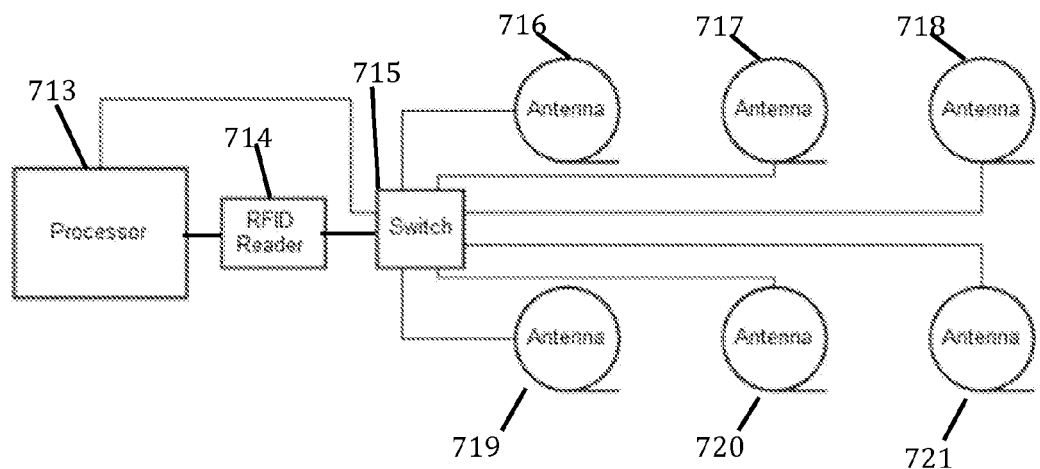
FIG. 7B is a diagram of an alternative activity block connection specification of a Master Block in accordance with certain aspects of the invention.

FIG. 7B is another embodiment of an Activity Block Connection Specification 307 of a Master Block, controlled by the Master Block's processor 713, in accordance with certain aspects of the invention. This embodiment is similar to the one shown in FIG. 7A with the difference that it uses only one RFID reader 714 instead of one per antenna. In order to allow each antenna 716, 717, 718, 719, 720, and 721, to be accessed separately, a switch 715 has also been added between the RFID reader 714, and the antenna 716, 717, 718, 719, 720, and 721. When the processor determines that the Master Block should be scanning for connected Activity Blocks, it activates the RFID reader 714 and begins iterating through each antenna using the switch 715. The switch 715 sends the signal from the RFID reader 714 to one antenna, for example 716, the RFID reader 714 searches for any Activity Blocks in proximity to that antenna. The switch 715 then sends the signal to a different antenna and the process repeats until every antenna 716, 717, 718, 719, 720, and 721 has been scanned. In all other respects the use of this embodiment of the activity block connection specification 307 is identical to the one shown in FIG. 7A.

FIG. 8 is a flowchart of a process for an Electronic System 100 to communicate with a Master Block 103 in accordance with aspects of the invention. The process may be performed utilizing a standard communication protocol, for example, one of the wireless Bluetooth protocols or wired USB connection. Furthermore the process may communicate with any peripheral that performs any of the process illustrated in FIG. 9.

In block 802, the process begins searching for a Master Block 103, or similar peripheral, that it may connect to. The nature of this search is determined by the specific communication being used for the process. For example, in an embodiment of the process that uses the Bluetooth 4.0 protocol, the process will search for any Bluetooth 4.0 radios that broadcast their presence with an appropriate identifier. Once this search has been completed the process continues to block 803.

In block 803, the process determines if any Master Blocks, or other appropriate peripherals, have been identified. When the process determines that no peripherals or Master Blocks 103 have been found, it returns to block 802. When the process determines that a Master Block 103 or appropriate peripheral has been found the process continues to block 804.

The location of a Master Block 103 characterized by block 802 and 803 depends on aspects outside of the process, e.g. the existence of a Master Block to connect to, and the ability of that Master Block to connect. Therefore, the process of 802 and 803 repeats this process until a Master Block is found.

In block 804, the process attempts to connect to the identified Master Block or peripheral. The nature of this connection depends on the specific communication protocol used for the process. Once a connection protocol has been followed, the process continues to block 805.

In block 805, the process determines if there is an active connection to a Master Block 103 or other appropriate peripheral. The nature of this determination depends on the specific communication protocol used by the process. If there is no connection, the process returns to block 802 to attempt to search and connect to a Master Block 103. If a connection is established, the process continues to block 806.

In block 806, the process determines if the Master Block, or similar peripheral, should be actively scanning its own state. This determination is based on processing the System State 203 referenced in FIG. 2. Because much of the System State 203 is controlled by a software layer separate from the present process, the determination to actively scan may vary in results every time a determination is made. If the Master Block or peripheral should not be scanning as determined by the System 100, the process moves to block 807; otherwise, the process moves to block 808.

In block 807, the process checks the stored state of the Master Block or peripheral to see if it is currently scanning, and sends a stop scanning command over the communication protocol in use only if the Master Block or peripheral is currently scanning. Afterward, the process continues to block 807.

In block 808, the process checks the stored state of the Master Block or peripheral to see if it is currently scanning, and sends a start scanning command over the communication protocol in use only if the Master Block or peripheral is not currently scanning. Afterward, the process continues to block 809.

In block 809, the process waits to receive an updated System State 301 from the Master Block 103 or peripheral and stores the system state in the memory specification 204. Afterward, the process continues to block 810.

In block 810, the process processes the current system state 203 then moves on to block 811.

In block 811, the process sends any write commands it has queued to the Master Block 103 or peripheral. Once all queued write commands have been sent to the Master Block 103, the process returns to block 805.

Figure 9:
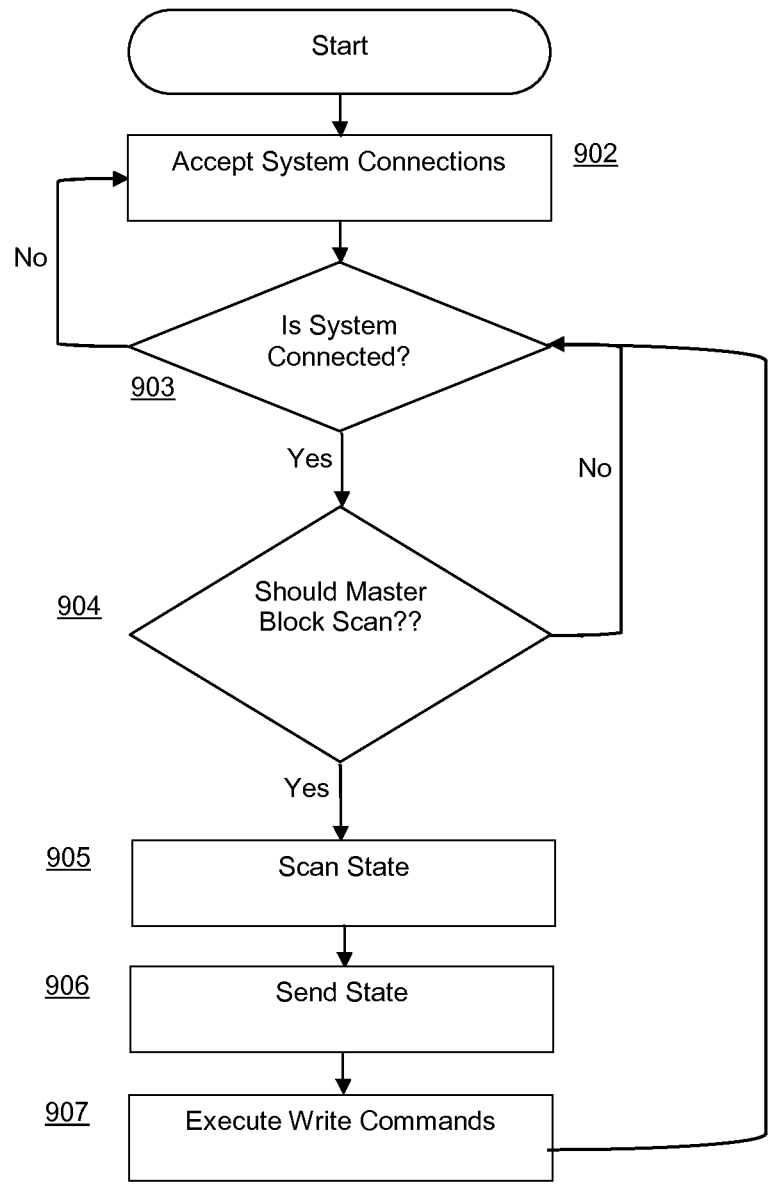
FIG. 9 is a flowchart of the process used by a Master Block to manage the connection to a System, and to Activity Blocks, in accordance with certain aspects of the invention.

FIG. 9 is a flowchart of a process for a Master Block to communicate with a System in accordance to certain aspects of the invention. The process may be performed utilizing a standard communication protocol, for example, one of the wireless Bluetooth protocols or wired USB connection.

In block 902, the process prepares itself to receive a connection from an Electronic System 100. The specifics of this preparation depend on the communication protocol being used. For example, if the process is using a Bluetooth 4.0 protocol the Master Block 103 will begin broadcasting its existence with the Bluetooth radio. Once the preparation to accept a connection to a Electronic System 100 is complete the process continues to block 903.

In block 903, the process determines if it has an active connection to an Electronic System 100, and if so, the process continues to block 904; otherwise it returns to block 902.

In block 904, the process checks the system state 301 of Master Block 103 to see if it should be scanning. If the process should be scanning, it continues to block 905; otherwise it returns to block 903.

In block 905, the process begins updating the memory specification 309 of the Master Block 103 by checking for any Activity Blocks connected to it. The specifics of this process depend on the type of presence and identification sensors used for the Activity Block Connection Specification 307 in the embodiment of the Master Block 103. For example, if the embodiment of the Master Block uses ISO/IEC 14443 Standard for Identification Cards, the process would activate the radio frequency transmitters and check for the presence of Activity Blocks, and the identity of those Activity Blocks. One such embodiment is outlined in FIG. 7A. Once this update is complete, the process continues to block 906.

In block 906, the Master Block 103 sends the current system state 301 to the connected Electronic System 100. The specifics of this data transfer depend on the communication protocol used between the Master Block 103 and Electronic System 100. Once this transfer is complete, the process continues to block 907.

In block 907, the Master Block 103 executes any queued write commands, potentially modifying the memory specification 309, visual 201, audio 202, or other output 214, or sending write commands to connected Activity Blocks. Following the execution of all write commands, the process returns to block 903 to repeat the update loop.

Figure 10:
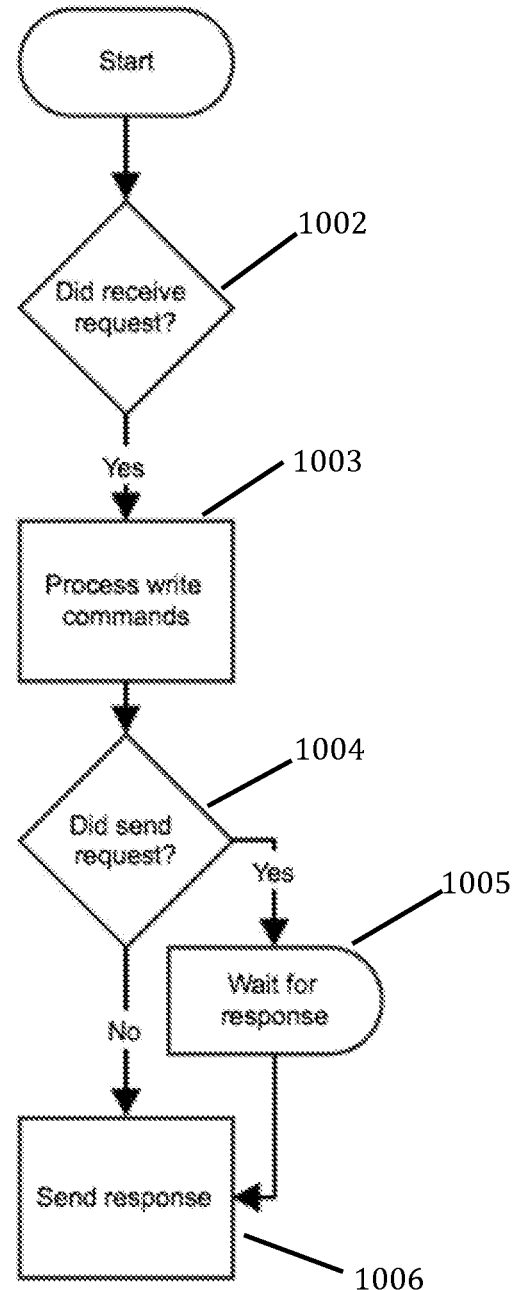
FIG. 10 is a flowchart of the process used by an Activity Block to respond to an incoming request from either a Master Block or other Activity Block in accordance with certain aspects of the invention.

FIG. 10 is a flowchart of the process for an Activity Block 104 to communicate with a Master Block 103 or other Activity Blocks in accordance with certain aspects of the invention. Not all embodiments of Activity Blocks have the capacity to communicate with other Activity Blocks, but the basic process remains the same regardless. This process can be accomplished with many standard communication protocols, for example, the ISO/IEC 14443 Standard for Identification Cards. Some embodiments of an Activity Block may use two separate communication protocols for this process, one to communicate with a Master Block 103 and one to communicate with other Activity Blocks arranged in a two- or three-dimension grid.

In block 1002, the Activity Block determines if it has received any requests from a Master Block or other Activity Block. The specifics of this request are determined by the type of communication protocol being used in the process. If there has been a request, the process continues to block 1003, otherwise the process remains in block 1002 until a request comes in.

In block 1003, the Activity Block processes any write actions contained in the incoming request. Write actions may include sending data to any outputs, visual output 201, audio output 202, or other output 214, included in the embodiment of the Activity Block. For example, turning on an LED for visual output, or playing a sound on a speaker for audio output. Write actions also include sending a request to another connected Activity Block, if such capability is included in the embodiment of the Activity Block. Once all write actions from the request have been completed, the process continues to block 1004.

In block 1004, the process checks if any requests have been sent to other Activity Blocks. If the embodiment of the Activity Block does not have the capacity to send requests, this check will always be false. If a request has been sent, the process continues to block 1005, otherwise it continues to block 1006.

In block 1005, the process waits for a response from any Activity Blocks that were sent requests from this Activity Block in block 1003. Once the responses have arrived, the process continues to block 1006.

In block 1006, the Activity Block sends a response back to the source of the original request. This response contains information from the Memory Specification 502 as well as data from any responses collected in block 1005. Once the response has been sent, the process is complete until another request comes in and the process repeats.

Figure 11:
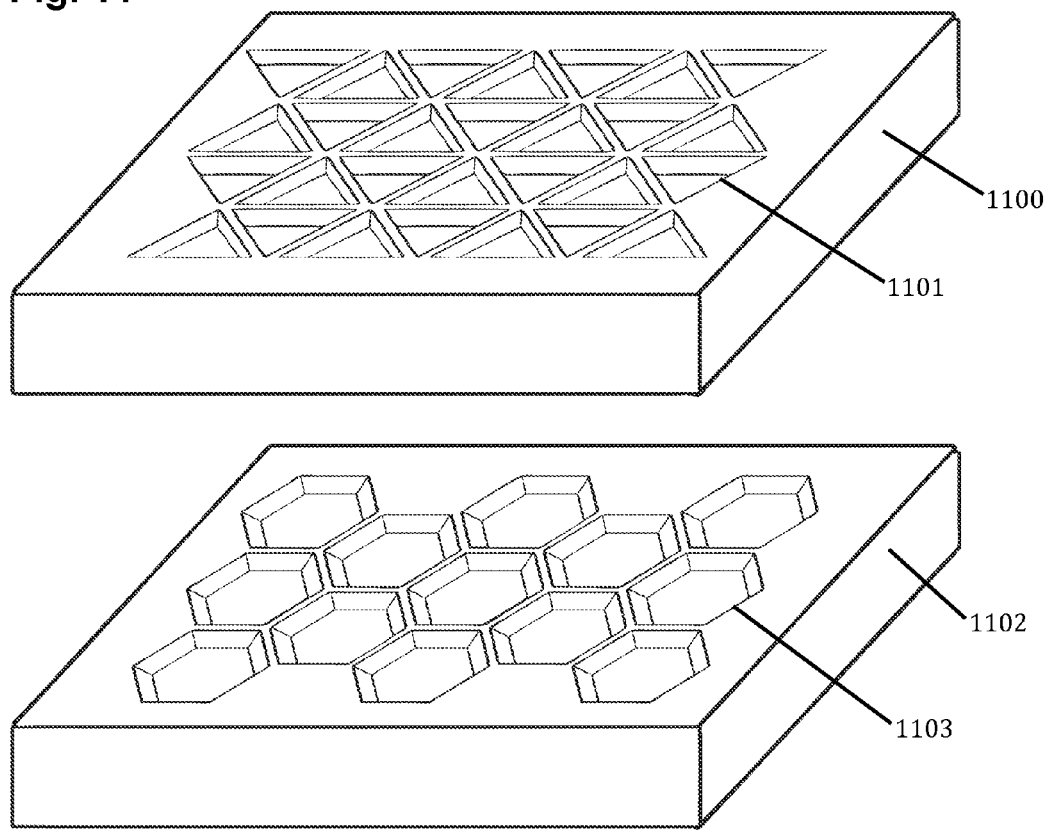
FIG. 11 is an example of different pocket shapes of the invention in accordance with certain aspects of the invention.

FIG. 11 shows an embodiment in which Master Block 1100 is functionally identical to other embodiments of the invention but with triangular-shaped pockets 1101 that permit or deny Activity Blocks to be connected based on Activity Block shape as it relates to certain aspects of the invention. Pockets 1101 are arranged in a grid-like structure for row, column, and height positioning of Activity Blocks as read by Master Block 103. Similarly, Master Block 1102 has hexagonal-shaped pockets 1103 that permit or deny Activity Blocks to be connect based on Activity Block shape as it relates to certain aspects of the invention. Pockets 1103 are arranged in a grid-like structure for row, column, and height positioning of Activity Blocks as read by Master Block 103.

Figure 12:
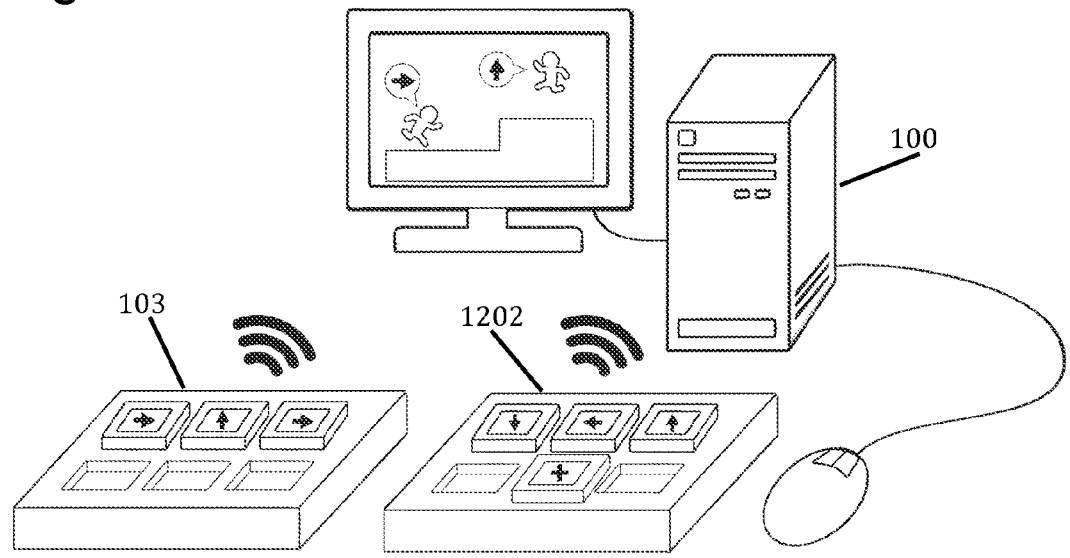
FIG. 12 is an example of a single System connected to multiple Master Blocks in accordance with certain aspects of the invention.

FIG. 12 shows an embodiment in which two Master Blocks 103 and 1202 are connected to a single Electronic System 100. The processes managing these connections are the same as they would be if there was only a single connection, but the System 100 must run one instance of the process described in FIG. 8 for each Master Block it's connected to in order to properly manage all connections. Some embodiments may also expand to more than two Master Blocks connected to a single System 100, although there may be limits imposed by the communication protocol used to manage those connections, for example, if the embodiment uses a wired connection between Master Blocks 103 and Electronic System 100, the number of physical connection points could limit the number of Master Blocks that could be connected to the System 100. The potential purpose of connecting multiple Master Blocks to a System 100 include giving a game player more places to place Activity Blocks, or allowing multiple game players to interact with a single System 100 at the same time, each using their own Master Block.

Figure 13:
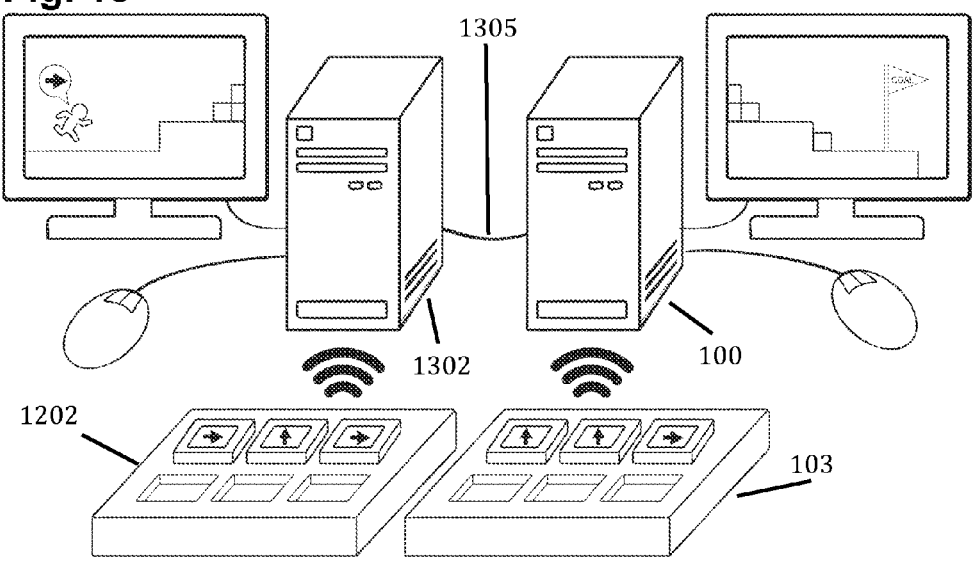
FIG. 13 is an example of multiple Systems connected together, each System also being connected to their own Master Block, in accordance with certain aspects of the invention.

FIG. 13 shows an embodiment in which two Systems 1302 and 100 are each connected to their own Master Block 1202 and 103 and are also connected to each other via standard networking cable for data transmission 1305, which could also be a wireless communication protocol in other embodiments of the invention. The connection between the two Electronic Systems 1302 and 100 could be managed through standard communication protocols through the internet or intranet, using wired or wireless connections. This can also be expanded in other embodiments of the invention to include more than two Systems, either by having each System connect to every other Electronic System, or by having each System connected to a central server. Through these connections, each System can learn the current state of any Master Block connected to any other System. For instance, Electronic System 1302 could learn the state of Master Block 103 by sending a request to Electronic System 100 for that data. Through a connection between multiple Systems, 1302 and 100, multiple game players could interact with one other via their respective System, with mouse and keyboard, and/or their respective Master Block, 1202 and 103, regardless of the physical proximity between each player to the other(s).

Figure 14:
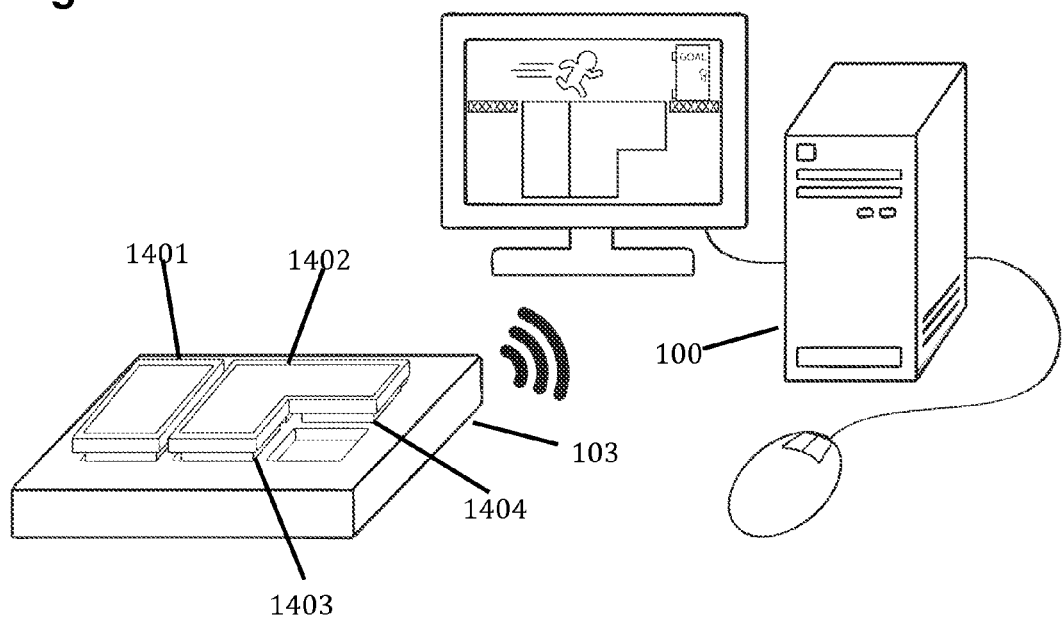
FIG. 14 is an example of multiple Activity Blocks being physically joined together in accordance with certain aspects of the invention.

FIG. 14 shows an embodiment in which multiple Activity Blocks 1403 and 1404 are joined together by a physical piece with machine-readable data attached to each 1402, furthermore, the joining piece 1402 may allow for both Activity Blocks 1403 and 1404 to connect to the Master Block 103 simultaneously. The Activity Blocks 1403 and 1404 communicate with the Master Block 103 in the same manner and with the same capabilities as any other Activity Block; however, if the instructions providing for game play are designed with the assumption that these Activity Blocks 1403 and 1404 are physically joined, information from the Activity Blocks 1403 and 1404 can be used to determine the position and orientation of the joining piece 1402. In this way, the joining piece 1402 can considered as an Activity Block with more functionality by the game player.

Figure 15:
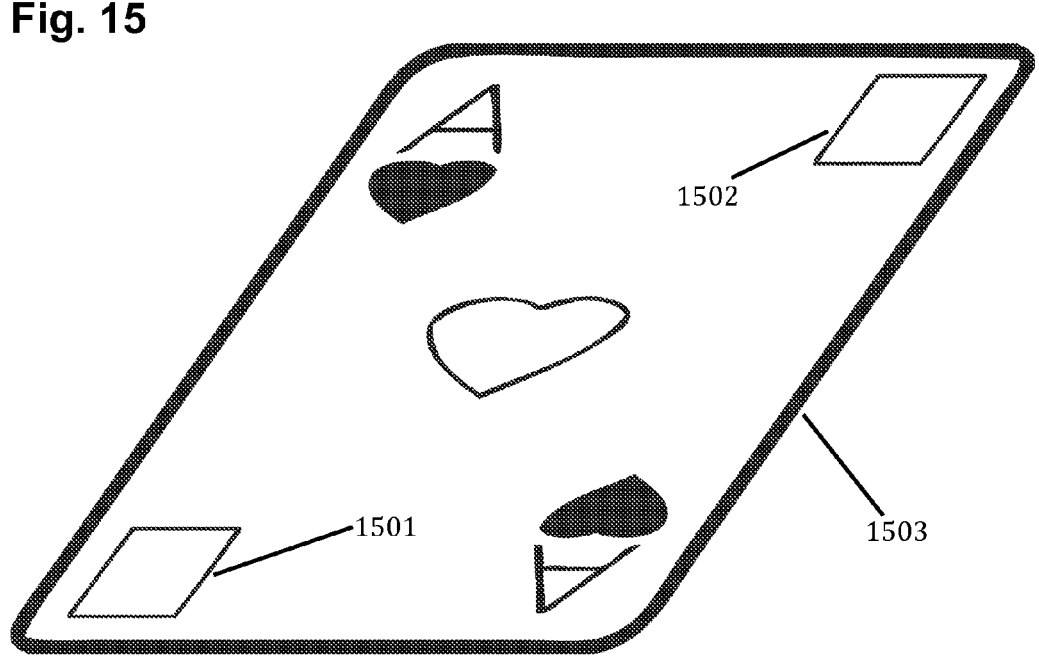
FIG. 15 is example of multiple Activity Blocks being physically joined together into the shape of a playing card in accordance with certain aspects of the invention.

FIG. 15 shows another variation on multiple Activity Blocks 1501 and 1502 connected by a joining piece 1503. In this case, the joining piece 1503 is in the form of a playing card and aligns to the grid of pockets in Master Block 103. For more information, refer to the description in FIG. 14 and the functionality associated with Activity Block 1402.

Figure 16:
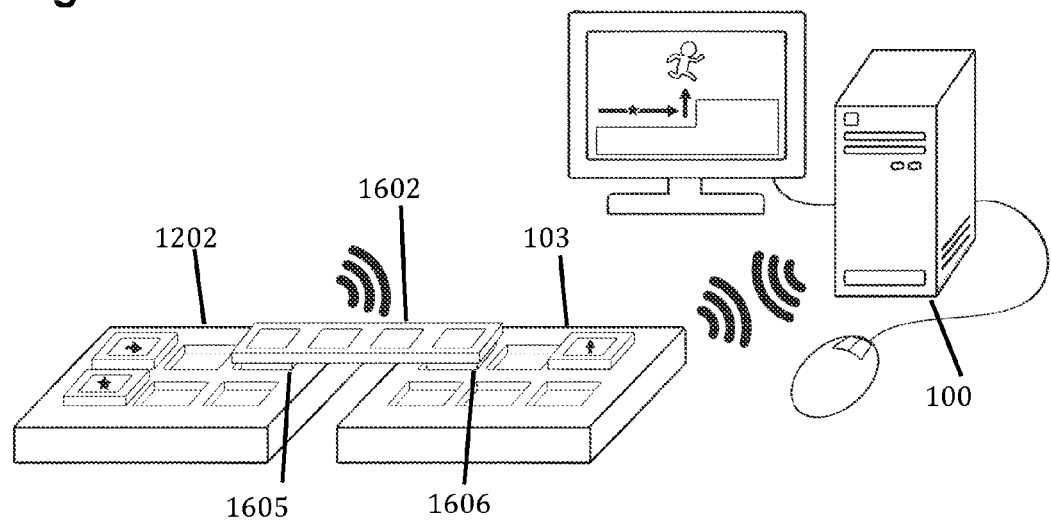
FIG. 16 is an example of multiple Activity Blocks being physically joined together with each Activity Block being connected to a different Master Block in accordance with certain aspects of the invention.

FIG. 16 shows a third variation on multiple Activity Blocks 1605 and 1606 attached to a joining piece 1602 that aligns to the grid on both Master Block 1202 and 103. In this embodiment, the joining piece allows each of the Activity Blocks to connect to different Master Blocks. In this case, Activity Block 1605 is connected to Master Block 1202 while Activity Block 1606 is connected to Master Block 103. With both Master Blocks 1202 and 103 connected to an Electronic System 100, the System 100 is able to determine a relationship between the two Master Blocks 1202 and 103 based on the locations of the Activity Blocks 1605 and 1606 and prior knowledge of the relative positions, aligned to the grid of reading locations, of those Activity Blocks in the joining piece 1602.

Figure 17:
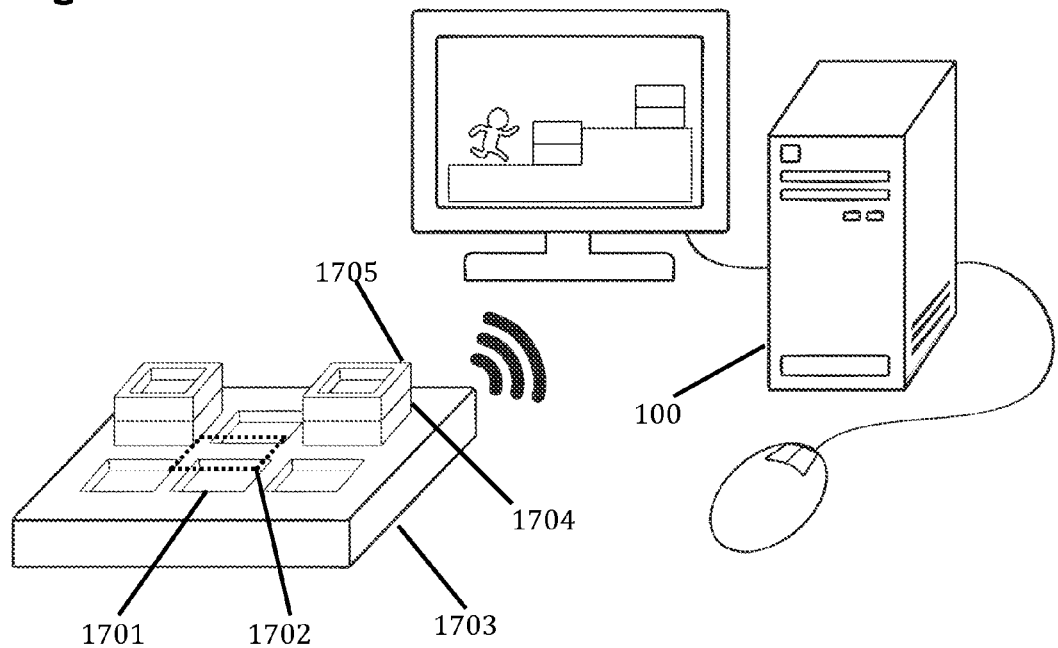
FIG. 17 is an example of a Master Block with the capacity to connect to Activity Blocks that are not physically connected to the Master Block in accordance with certain aspects of the invention.

FIG. 17 shows an embodiment of a Master Block 1703 which has reading locations that are not physically connected to the Master Block, but still align to a three-dimensional grid, in accordance with certain aspects of the invention. 1701 is a reading location that is physically attached to the Master Block 1703 as is typical of most embodiments. 1702 is a reading location directly above 1701, aligned to a three dimensional grid of reading locations. As with all reading locations of the Master Block 1703, the Master Block 1703 can detect the presence of, and read information from, any Activity Block placed in a reading location in the second layer of the three-dimensional grid 1702, and differentiate that data from data collected from any other reading location. For instance, Activity Blocks 1704 and 1705 are in two separate reading locations of the Master Block 1703, the reading location that Activity Block 1705 is in is not physically attached to the Master Block 1703 yet the Master Block 1703 can determine that Activity Block 1705 is above Activity Block 1704 and not the other way around because the two Activity Blocks 1704 and 1705 are in different reading locations, however, still aligned to the grid.

Figure 18:
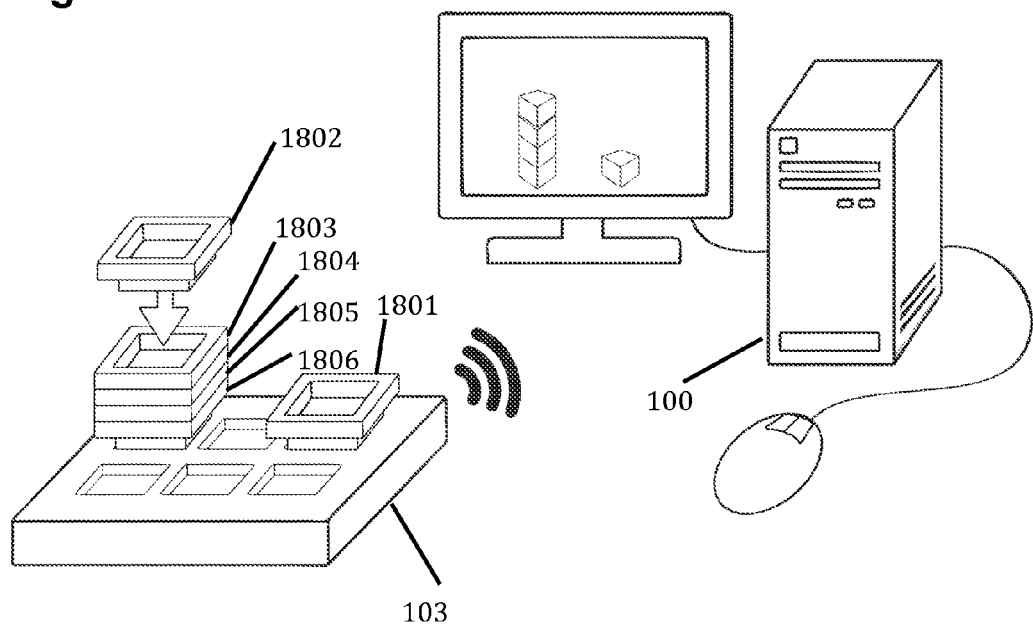
FIG. 18 is an example of Activity Blocks connected to each other for the purpose of indirectly connecting to a Master Block in accordance with certain aspects of the invention.

FIG. 18 shows an embodiment in which Activity Blocks have the capacity to communicate with each other, which aligned in a three-dimensional grid, for the purpose of relaying information to and from the Master Block 103, in accordance with certain aspects of the invention. In the diagram, only Activity Blocks 1801 and 1806 are directly connected to the Master Block 103, however, the Master Block 103 can indirectly detect presence, data, and location of Activity Blocks 1803, 1804, and 1805. When the Master Block 103 requests data from Activity Block 1806, the Activity Block 1806 will detect the presence of Activity Block 1805 and relay the request for information to Activity Block 1805. Activity Block 1805 will in turn send a request to Activity Block 1804, when then sends the request to Activity Block 1803. Activity Block 1803, being the last Activity Block in the chain, will respond to Activity Block 1804 with its data. Upon receiving the data from Activity Block 1803, Activity Block 1804 will increment a position value within the received data, then combine both the received data and its own data into a single data packet and send the data packet to Activity Block 1805. Activity Blocks 1805 and 1806 will repeat this process of incrementing data and sending all other data along with their own data. The Master Block 103 will receive all of the data from the entire stack of Activity Blocks 1806, 1805, 1804, and 1803 at once from Activity Block 1806 and use the position values that have been incremented by the Activity Blocks as a way to determine the order of Activity Blocks in the stack, which is aligned to the three-dimensional grid.

Figure 19:
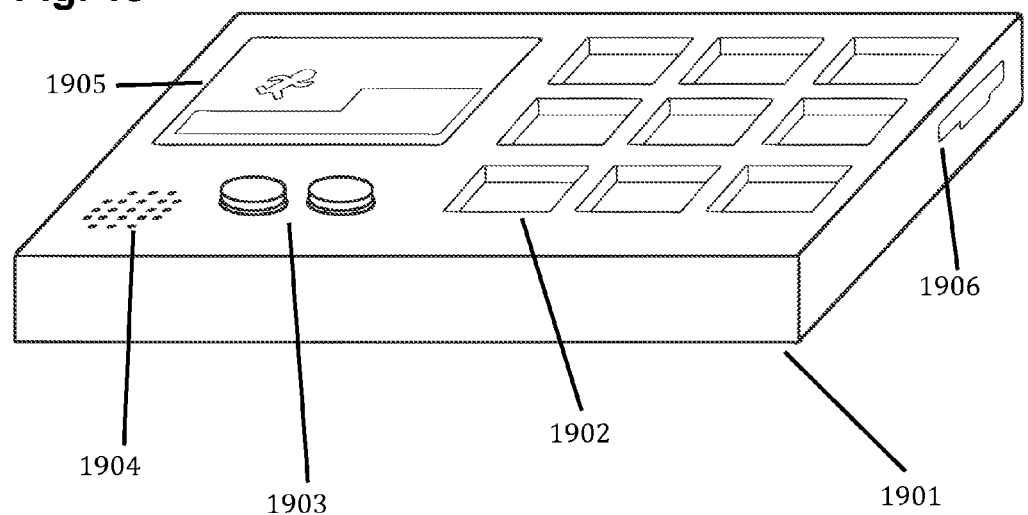
FIG. 19 is an example of a Master Block with additional capabilities in accordance with certain aspects of the invention.

FIG. 19 shows an embodiment of a Master Block 1901 that includes a visual display 1905 audio output 1904 buttons 1903 for user input and removable memory 1906 in addition to the Activity Block Connection Specification 1902 that is characteristic of a Master Block. Input from the buttons 1903 and removable memory 1906 would be sent to the memory specification 309 and from then sent to the connected Electronic System 100 during block 906 of the Master Block connection process described in FIG. 9. Output to the visual display 1905, audio output 1904 and removable memory 1906 is received from the Electronic System 100 over the network specification 305 and output accordingly.

Figure 20:
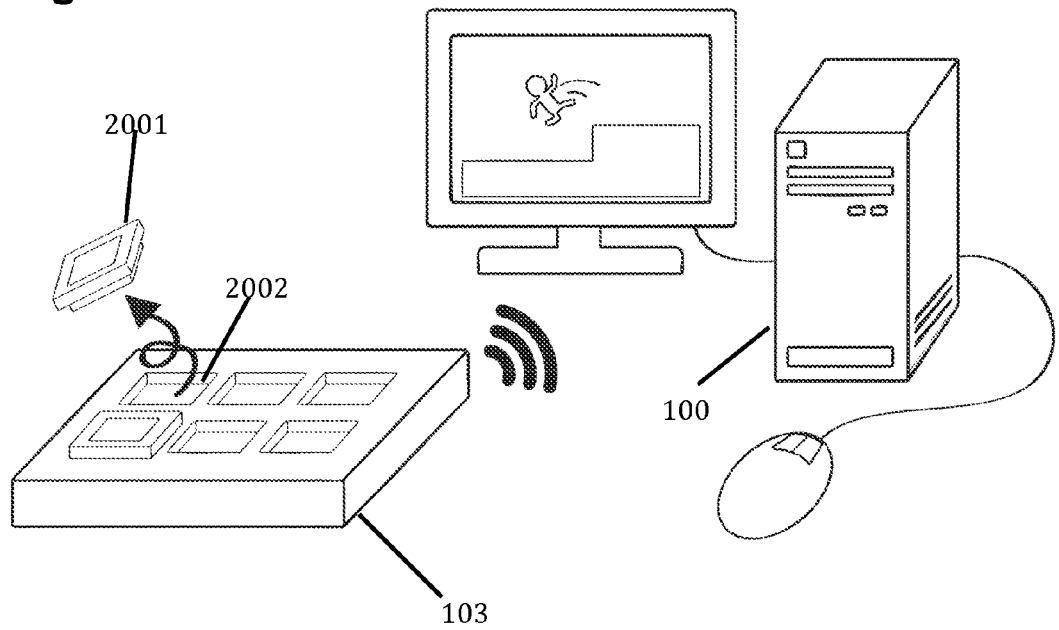
FIG. 20 is an example of a Master Block with physical output for the purpose of ejecting connected Activity Blocks in accordance with certain aspects of the invention.

FIG. 20 shows an embodiment of a Master Block 103 that has the capacity for physically knocking connected Activity Blocks 2001 off of the Master Block 103 as a form of physical output. The resulting new location of the Activity Block is not aligned to the grid of pockets on Master Block 103 and therefore not detectable by the Master Block 103. Alternatively, the action of knocking a connected Activity Block 2001 out of one reading location on the Master Block 103 could move the Activity Block 2001 into a separate reading location on the Master Block 103, allowing the Master Block 103 to detect the new position of the Activity Block 2001 in the grid of reading locations. Each reading location on the Master Block 2001 contains a kicker 2002, such as a repulsive magnetic field or physical spring, to impart kinetic force to the Activity Block in the reading location. The Master Block 103 activates each kicker 2002 in response to a specific command from the Electronic System 100.

Figure 21:
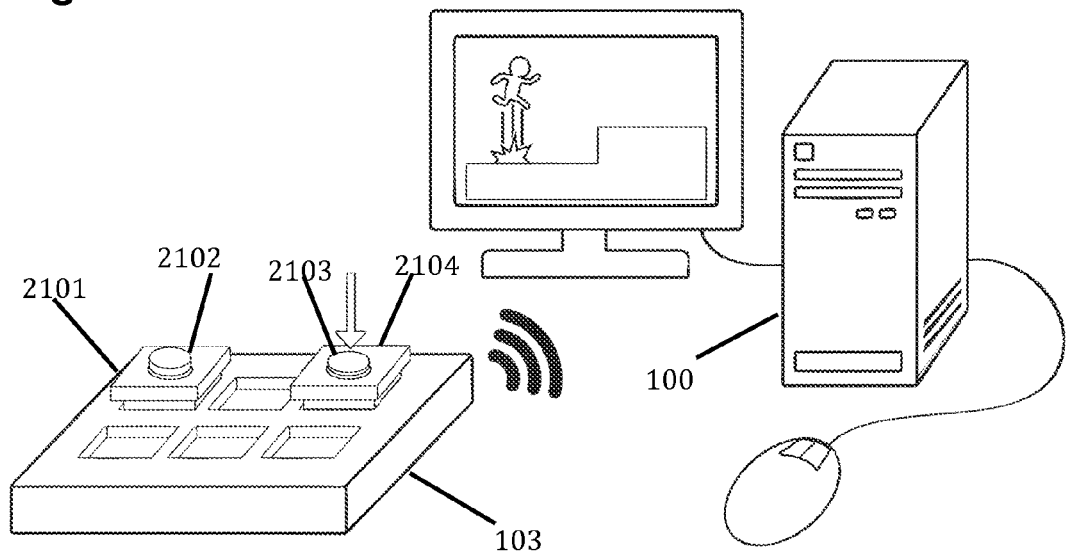
FIG. 21 is an example of Activity Blocks with user input capabilities in accordance with certain aspects of the invention.

FIG. 21 shows an embodiment in which Activity Blocks 2101 and 2104 can have user input devices, such as buttons 2102 and 2103 in accordance with certain aspects of the invention. These Activity Blocks 2102 and 2103 function identically to other Activity Blocks in the grid of pockets with the exception that part of their internal data reflects the current state of the input, i.e. whether the button is up or down. As usual, when the Master Block 103 sends a request to the Activity Block 2101 or 2104, the Activity Block responds with all of its data, including the state of the user input, for example, the state of buttons 2102 and 2103. The Master Block 103 will then relay that data to the Electronic System 100. In this way, the Electronic System 100 can utilize any user input functionality on Activity Blocks the same way it would use data regarding the position and identity of Activity Blocks attached to the Master Block 103.

Figure 22:
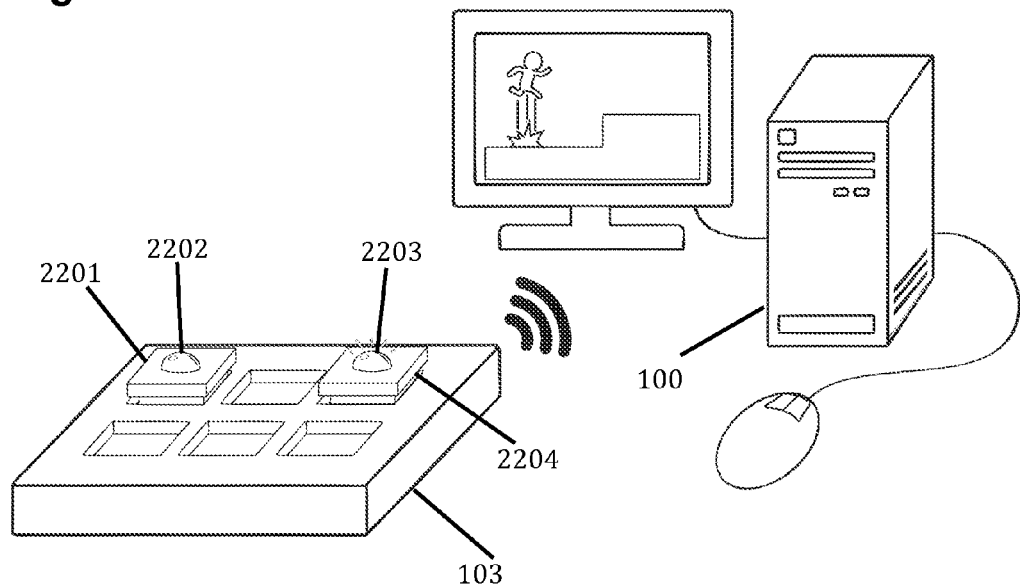
FIG. 22 is an example of Activity Blocks with visual output capabilities in accordance with certain aspects of the invention.

FIG. 22 shows an embodiment in which Activity Blocks 2201 and 2204 can have visual output, such as LEDs 2202 and 2203 in accordance with certain aspects of the invention. Activity Blocks 2202 and 2203 function identically to other Activity Blocks with the exception that the current state of the output, i.e. whether the LED is on or off, reflects part or all of their internal data. As per other embodiments of the invention, when the Master Block 103 sends a request to the Activity Block 2201 or 2204, which are aligned to the grid of pockets and therefore can be read by Master Block 103, it can include a command to alter the data stored in the Activity Block, if the Electronic System 100 requested such a command be sent. If the data being altered corresponds to the state of the visual output, the output will change. In this way, the Electronic System 100 can provide visual feedback to the game player through any Activity Blocks 2201, 2204 with visual output capabilities.

Figure 23:
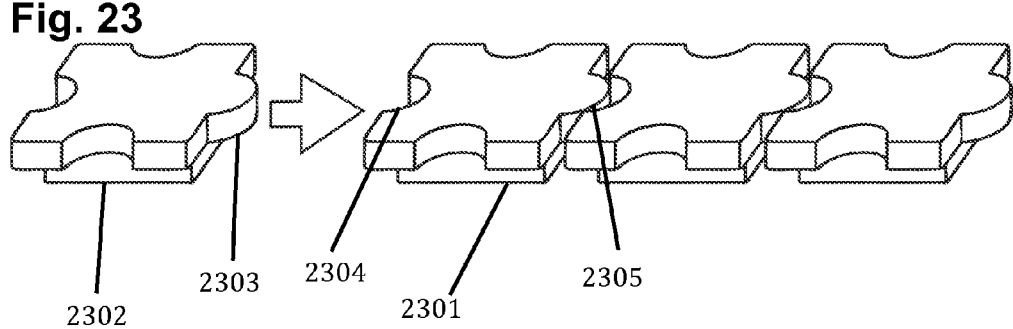
FIG. 23 is an example of Activity Blocks whose physical shape provides constraints for what other Activity Blocks can be placed adjacent to them, as well as their orientation, in accordance with certain aspects of the invention.

FIG. 23 shows as an embodiment in which Activity Blocks have shapes that physically constrain what other Activity Blocks can be placed in adjacent reading locations aligned to the grid of pockets on the Master Block, as well as the orientation of those Activity Blocks within the grid. For example, in the diagram Activity Block 2302 can be placed next to Activity Block 2301 with the protrusion 2303 on 2302 fitting into the notch 2304 on 2301 while aligning to the grid of pockets on Master Block 103. However, if Activity Block 2301 were rotated 180 degrees so the protrusion 2305 were facing to the left, block 2302 physically could not fit to the left of block 2301 without rotating itself. These physical constraints can be used to provide additional context to inform the game player of what actions are most likely to help them achieve their goals.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

We claim:

1. A method of providing data to a software application comprising the steps of:
   a. providing a plurality of first devices, a second device in communication with each first device of the plurality of first devices, and a processor in communication with the second device and an output device, wherein the processor executes the software application with data provided by the each first device of the plurality of first devices and the second device;
   b. reading instructions contained on the each first device of the plurality of first devices placed in pockets of the second device to form a grid;
   c. creating a data packet including the instructions of the each first device of the plurality of devices and a location of the each first device of the plurality of first devices relative to the second device, and further comprising: a row number and a column number associated with a two-dimensional grid of the second device; and sequentially arranging the instructions of the each first device of the plurality of devices within the data packet in the order of placement of the each first device of the plurality of first devices in pockets of the second device; and
   d. executing the software application with the data packet for output to the output device.

2. The method according to claim 1, wherein the step of creating the data packet further comprises a first device stacked level number associated with a three-dimensional grid of the second device.

3. The method according to claim 1, further comprising the step of rewriting the instructions of the each first device of the plurality of first devices.

4. The method according to claim 3, wherein the step of rewriting the instructions of the each first device of the plurality of first devices further comprises creating a new instruction data packet containing the new instructions and the location of the each first device of the plurality of first devices in pockets of the second device.

5. The method according to claim 1, wherein steps b-d are repeated upon the addition to or removal from the grid of one or more first devices.

6. The method according to claim 2, further comprising the step of determining the first device stacked level number based on relative signal strengths of adjacent first devices of the plurality of first devices.

7. The method according to claim 6, wherein the step of determining the first device stacked level number further comprising the steps of: measuring signal strength emitted from the each first device of the plurality of first devices; comparing signal strengths of adjacent first devices of the plurality of devices; and assigning increasing level numbers as signal strengths decrease.

8. The method according to claim 1, further comprising the steps of: relaying request for information to the each first device of the plurality of first devices; and replying to the request with a position value of the each first device of the plurality of first devices associated with a level of a first device stacked arrangement.

9. A data system to interface with a software application, the data system comprising:
- a plurality of first devices, wherein each first device contains instructions;
- a second device in communication with each first device of the plurality of first devices in pockets of the second device, wherein the second device comprises a plurality of first device readable cells arranged in rows and columns to form a grid;
- a data packet including the instructions of the each first device of the plurality of devices and a location of the each first device of the plurality of first devices relative to the second device, and further comprising:
- a row number and a column number associated with a two-dimensional grid of the second device; and
- sequential arrangement of the instructions of the each first device of the plurality of devices within the data packet in the order of placement of the each first device of the plurality of first devices in pockets of the second device; and
- a processor in communication with the second device and an output device, wherein the processor executes the software application with data packet information provided by the each first device of the plurality of first devices and the second device.

10. The data system according to claim 9, wherein the instructions of the each first device of the plurality of first devices are rewriteable.

11. The data system according to claim 9, wherein the second device further comprises sensors to detect placement of the each first device of the plurality of first devices in pockets of the plurality of first device readable cells.

12. The data system according to claim 9, wherein the each first device of the plurality of first devices comprises a bottom surface and a top surface, wherein the bottom surface and the top surface are configured such that the bottom surface of a first device mates with the top surface of a second first device to form a stacked configuration of a three-dimensional grid, and the date packet further comprises a first device stacked level number associated with the three-dimensional grid of the second device.

13. The data system according to claim 12, wherein the stacked first devices communicate with adjacent first devices of the stacked first devices.

14. The data system according to claim 9, wherein the data includes status of one or more first devices of the plurality of first devices in pockets of the plurality of first device readable cells.

15. The data system according to claim 14, wherein the data is updated when one or more first devices of the plurality of first devices are added or removed from the grid.

16. The data system according to claim 13, wherein data of each stacked first device of the stacked first devices includes a position value for the determination stack level of the three-dimensional grid.

17. The data system according to claim 12, wherein the each first device further comprising a signal emitter, and the second device further comprising a signal receiver and a relative signal strength comparator for the determination stack level of the three-dimensional grid.

18. The data system according to claim 9, wherein the second device, the processor, and the output device are housed in a single structure.

* * * * *